US006996546B1

(12) United States Patent
Giles et al.

(10) Patent No.: US 6,996,546 B1
(45) Date of Patent: Feb. 7, 2006

(54) SYSTEM AND METHODS FOR DIGITAL RECEIPTS

(75) Inventors: Christopher Giles, Foster City, CA (US); JP Leon, San Carlos, CA (US)

(73) Assignee: Neopost Inc., Hayward, CA (US)

( * ) Notice: Subject to any disclaimer, the term of this patent is extended or adjusted under 35 U.S.C. 154(b) by 610 days.

(21) Appl. No.: 09/967,787

(22) Filed: Sep. 28, 2001

(51) Int. Cl.
*G06F 17/60* (2006.01)

(52) U.S. Cl. ............................ 705/60; 705/61; 705/65; 705/400; 705/401; 705/410; 705/408; 705/406; 713/189; 380/277

(58) Field of Classification Search .................. 705/60, 705/65, 75, 61, 400, 410; 713/189; 380/277
See application file for complete search history.

(56) References Cited

U.S. PATENT DOCUMENTS 5,822,739 A 10/1998 Kara
5,915,022 A * 6/1999 Robinson et al. ............. 705/75
6,208,980 B1 3/2001 Kara
6,341,353 B1 * 1/2002 Herman et al. ............. 713/201
6,543,683 B2 * 4/2003 Hoffman ..................... 235/375

FOREIGN PATENT DOCUMENTS

EP 0474360 A2 * 3/1992

OTHER PUBLICATIONS

Draft Information–Based Indicia Program (IBIP) entitled "Performance Criteria for Information–Based Indicia and Security Architecture for Open IBI Postage Evidence Systems (PCIBI–O)," The United States Postal Service, Feb. 23, 2000, 79 pages.

* cited by examiner

*Primary Examiner*—Salvatore Cangialosi
*Assistant Examiner*—Jalatee Worjloh
(74) *Attorney, Agent, or Firm*—Townsend and Townsend and Crew LLP; Steven J. Cahill

(57) ABSTRACT

A secure system for creating digital receipts, while minimizing the amount of data that is encoded in the digital receipt. The digital receipt provides authentication for a transaction. A digital receipt may be printed in the form of a code. The digital receipt digitally encodes a transaction identification code, a transaction amount or number of units authorized, and a digital signature. The digital receipt may be scanned or read to verify the authenticity of the transaction.

20 Claims, 2 Drawing Sheets

SYSTEM AND METHODS FOR DIGITAL RECEIPTS

BACKGROUND OF THE INVENTION

This invention relates to systems and methods for creating digital receipts, and more specifically, to systems and methods for creating digital receipts with a reduced amount of encoded data.

A previously known stamp 100 is shown in FIG. 1. Stamp 100 may be printed by a stamp printing device. Stamp 100 includes text and a code 102 as shown in FIG. 1. Traditionally, the United States Postal Service (USPS) IBIP program has required a digital stamp to include a 2-dimensional bar code 102 that digitally encodes a large amount of information. All this information requires a large number of bytes (e.g., 80 bytes), and code 102 may require a substantial amount of space on stamp 100 as shown in FIG. 1. This causes the need to print a large 2-dimensional code 102 to accommodate the large amount of data. In addition to printing this data, the data is also held on the server which authorizes each transaction. Types of data that are be placed on stamp 100 and corresponding data lengths in bytes are shown in Table 1.

TABLE 1

| Data Elements | Barcode data | Human-Readable Data | Lengths (Bytes) | Field Number |
|---|---|---|---|---|
| Indicia Version Number | Yes | No | 1 | 1 |
| Algorithm ID | Yes | No | 1 | 2 |
| Certification Serial Number | Yes | No | 4 | 3 |
| PSD Manufacturer ID | Yes | Yes | 2 | 4 |
| PSD Model ID | Yes | Yes | 2 | 5 |
| PSD Serial Number | Yes | Yes | 4 | 6 |
| Ascending Register | Yes | No | 5 | 7 |
| Postage | Yes | Yes | 3 | 8 |
| Date of Mailing | Yes | Yes | 4 | 9 |
| Originating Address (City, State, Zip code) | No | Yes | — | — |
| Originating Address (Registration Zip code) | Yes | No | 4 | 10 |
| Destination Delivery Point | Yes | No | 5 | 11 |
| Software ID | Yes | No | 6 | 12 |
| Descending Register | Yes | No | 4 | 13 |
| Mail Rate Category | Yes | No | 4 | 14 |
| Endorsement (Mail Class) | No | Yes | — | — |
| Digital Signature | Yes | No | DSA = 40; RSA = 128; ECOSA = 40 | 15 |
| Reserved Field | Yes | No | Variable Size | 16 |

Because stamp 100 is larger than a typical stamp, it would be desirable to reduce the size of code 102 so that it would fit on a standard size stamp and still pvovide enough room on the stamp for a design image.

BRIEF SUMMARY OF THE INVENTION

The present invention provides systems and methods for digital receipts. A digital receipt, which is digitally encoded on a medium, provides authentication of a transaction involving a service or item. A digital receipt may, for example, be printed in the form of a code on the medium. The digital receipt is scanned to verify the authenticity of the transaction.

The systems and methods of the present invention provide a secure system for creating digital receipts that may be authenticated by a verification system (e.g., at the Post Office other mail routing system), while minimizing the amount of data that is encoded in the digital receipt and maintaining the security of the data encoded therein. The digital receipt digitally encodes a transaction identification code, a transaction amount or number of services/items (i.e., units) authorized, and a digital signature. The digital receipt may be scanned or read to verify the value of the unit(s) and the authenticity of the transaction by accessing the key(s) used to authenticate the digital signature. A further understanding of the nature and advantages of the present invention may be realized by reference to the remaining portions of the specification and the drawings.

DETAILED DESCRIPTION OF THE INVENTION

The present invention includes systems and methods for digital receipts that authenticate a transaction related to a unit (e.g., a service or item). For example, a stamp may be created with a digital receipt. The digital receipt authenticates the purchase of the stamp at a specified postage value for the purpose of transmitting a letter or package through the mail. Digital receipts of the present invention may also be used to authenticate the purchase of numerous other types of services and items.

Digital receipts digitally encode at least a transaction identification code, a transaction amount or number of units authorized, and a digital signature. An originating system authorizes a transaction and creates a digital signature. The digital signature is generated by signing the transaction identification code and the transaction amount. The transaction identification code is used to identify the transaction. The amount of the transaction or the number of units authorized is used to ensure that the image created on the stamp can also be reproduced in human readable form, and to ensure that the amount of the transaction can be authenticated without the need for the system that originally authorized the transaction. Additional information may also be encoded into the digital receipt, if desired.

Embodiments of the present invention are shown and discussed with respect to digital receipts on stamps. However, digital receipts of the present invention can be used with transactions for numerous other types of services and/or items.

Figure 1:
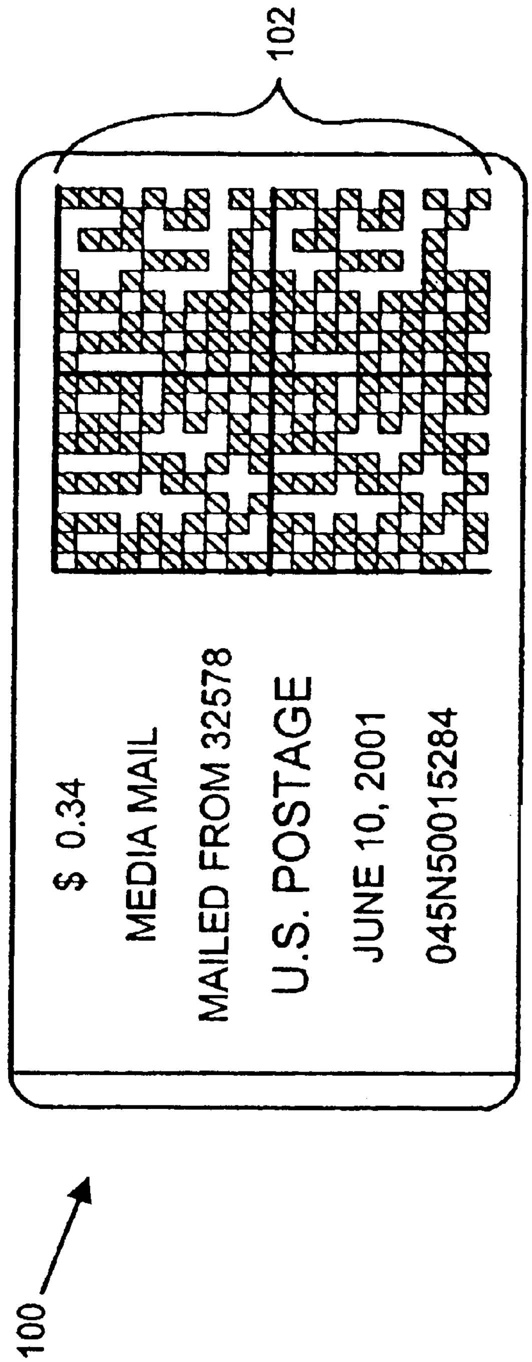
FIG. 1 is an illustration of a previously known stamp with a code.
Figure 2A:
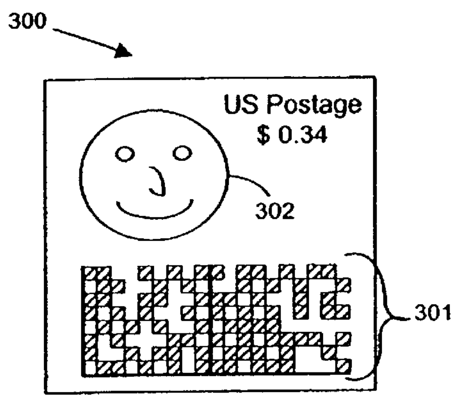
FIGS. 2A–2D are illustrations of four embodiments of media with digital receipts in accordance with the principles of the present invention.

FIG. 2A shows a stamp 300 which includes a first embodiment of a digital receipt created in accordance with the principles of the present invention. A stamp printing device prints stamp 300, which includes a code 301 and a design 302. Stamp 300 may be printed on a medium such as a small piece of paper. Code 301 is a digital receipt that digitally encodes a transaction identification code, a transaction amount or a number of stamps authorized, and a digital signature. The transaction amount is the monetary value that a customer paid for the stamp with digital receipt.

The transaction amount or number of stamps authorized indicates a postage value for stamp 300. The postage values indicates the face value of stamp 300. The transaction amount represents the postage value for the stamp and the monetary amount that is charged to the customer's account or credit card. The number of stamps is corresponded with a preset stamp value (e.g., 34 cents per stamp) to determine a monetary amount to charge the customer.

The transaction identification code is a series of numbers, letters, or other symbols that comprise a unique identifier for the purchase transaction. Code 301 is a two dimensional data matrix code. Code 301 may also be another suitable type of code such as a two dimensional Aztec bar code, a 3-DI code, an ArrayTag code, a Codablock code, a Code 1 code, a Code 16K code, a Code 49 code, a CP Code, a DataGlyphs code, a Datastrip Code, a Dot Code A, a hueCode, a MaxiCode, a MiniCode, a PDF 417 code, a Micro PDF417 code, a QR Code, a SmartCode, SnowFlake Code, a SuperCode, or an UltraCode.

In an embodiment of the present invention, digital receipts can be generated using a first system and a second system that is remote from the first system. The first and second systems may be, for example, a client and a remote server, respectively. The first system requests the second system for a transaction and transmits a transaction amount or number of units requested and a payment method (e.g., account number or credit card number) to the second system. The second remote system checks the customer's account for available funds. If funds are available, the second system generates a digital receipt for the transaction including a digital signature, and stores all appropriate data including, for example, key(s) for a digital signature encoded in the digital receipt, the transaction identification code, and the transaction amount or the number of units authorized. The second system then sends the digital receipt to the first system. The first system then produces the image with the digital receipt on a medium as shown, for example, in FIG. 2A. Alternatively, the first system stores the digital receipt on a computer readable medium for use at a later time, or allows the image to be produced at another source.

In another embodiment, digital receipts of the present invention can be generated by a first system that requests a plurality of transactions from a second system, which may be remote from the first system (e.g., client-server architecture). The first system transmits the amount of each transaction and a method of payment (e.g., account number or credit card number). The second system then checks for available funds, and if the second system determines that sufficient funds are available, the second system generates a digital receipt for each of the transactions including digital signatures, and stores all appropriate data, as discussed above. The second system then sends the digital receipts for each of the transactions to the first system. The first system then produces an image that includes the digital receipt on a medium as shown, for example, in FIG. 2A. Alternatively, the first system stores the digital receipt on a computer readable medium for use at a later time, or allows the image to be produced at another source.

In still another embodiment of the present invention, a single system processes requests transactions from customers and authorizes the requests. The single system produces the digital receipt and stores relevant data including the key(s) for verifying the digital signature encoded into the digital receipt. The system then stores the digital receipt or generates the digital receipt on a medium.

In one embodiment, stamps containing digital receipts of the present invention may, for example, be processed and verified by a United States Post Office (USPS) system. A Post Office scans code 301 on stamp 300 using a scanning device, which are well known in the art, to extract the digitally encoded information in code 301. The Post Office reads code 301 to verify the postage value of stamp 300. The transaction amount or number of stamps authorized indicates a postage value for stamp 300.

The Post Office system also reads the digital signature encoded in code 301 to verify the authenticity of stamp 300. The Post Office system verifies the digital signature by accessing the key(s) used to authenticate the digital signature as produced by the originating system that authorized the transaction. To reconstruct the data as required for the USPS IBIP, the USPS system must have access to the data stored on the system that authorized the original transaction. The USPS system may be in electronic communication with the authorizing system of server to access the key(s).

The nature of the key(s) used to authenticate the digital signature is determined by the cryptographic process used and is not restricted by this invention. The digital signature may, for example, comprises a public key and a private key in accordance with the Digital Signature Algorithm (DSA). DSA allows a recipient of a digital signature to verify the authenticity of the digital signature by comparing the public key with a code kept by the recipient. The private key is kept private so that the digital signature cannot be duplicated by the recipient. DSA is well known to those of skill in the art.

By encoding the transaction identification code into the digital receipt, the additional data that was encoded into code 102 in prior art stamp 100, including a date of mailing, an identification code for the software used by the stamp printing device, an identification code for the stamp printing device, an ascending register, and a descending register do not have to be encoded into code 301. All of this additional information can be stored in a database maintained by the originating system that authorized the transaction.

The database uses the transaction identification code encoded into code 301 to identify a particular transaction and to access data stored for that transaction such as the date of mailing, an ascending register, a descending register, and other information relating to the customer's account and the stamp purchase transaction. The USPS system (or other system) can access the stamp transaction data stored on the database using the transaction identification code. Therefore, the transaction identification code provides a reference for checking data (that was encoded directly into code 102 in the prior art) by merely accessing data stored on a database.

By limiting the amount of data that is digitally encoded in code 301 (e.g., 48 bytes) to a transaction ID code (e.g., 14 bits), a digital signature (e.g., 320 bits), and a transaction amount or number of units authorized (e.g., 50 bits), the size of code 301 is limited to a smaller area. The total size of stamp 300 is substantially reduced relative to prior art stamp 100, and may be the size of a typical postage stamp. Therefore, stamp 300 is more desirable and convenient to postal customers and takes up less space. Code 301 is small enough to fit into the lower half of stamp 300 as shown in FIG. 2A. Therefore, a design 302 and a postage value can be printed in the upper half of stamp 300. Design 302 makes stamp 300 more aesthetically pleasing to customers than stamp 100. Design 300 may comprise any image or pattern that can fit in the space provided.

Figure 2B:
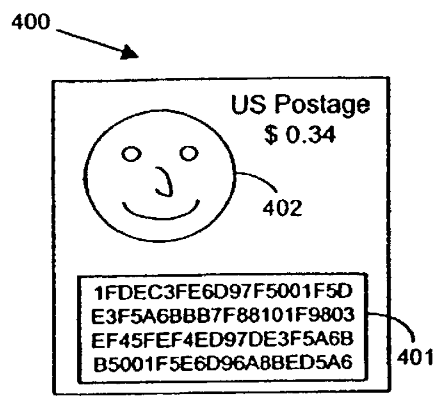

FIG. 2B shows another embodiment of a stamp 400 with a digital receipt in accordance with the present invention. Stamp 400 is printed on a medium such as a piece of paper. Stamp 400 includes a design 402 and a digital receipt 401. Digital receipt 401 includes a transaction ID, a digital signature, and a transaction amount or number of units authorized that are digitally encoded as human readable hexadecimal numbers, as shown in FIG. 2B. The hexadecimal code in receipt 401 may contain the same information as code 301. Code 301 contains data encoded in binary.

Figure 2C:
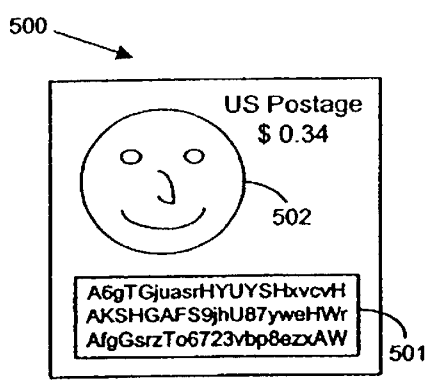

FIG. 2C shows a further embodiment of a stamp with a digital receipt in accordance with the present invention. Stamp 500 includes a design 502 and a digital receipt 501. Digital receipt 501 includes a transaction ID, a digital signature, and a transaction amount or number of units authorized that are digitally encoded as human readable, reduced size, base 64 numbers, as shown in digital receipt 501. If desired, numbers with other bases may be used instead of numbers with base 2, base 16, and base 64 shown in the examples of FIGS. 2A–2C.

Figure 2D:
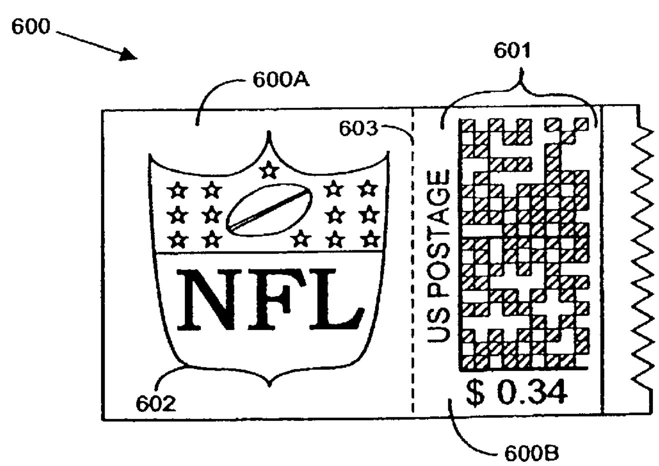

FIG. 2D is another embodiment of a stamp with a digital receipt in accordance with the present invention. Stamp 600 includes a design 602 and a digital receipt comprising a code 601. Code 601 includes a digitally encoded transaction ID, a digital signature, and a transaction amount or number of units authorized. A portion 600A of stamp 600 may be torn off from a portion 600B of stamp 600 (which includes code 601) along perforated edge 603. Portion 600A, which includes image 602, may be retained by a postal customer as a collector's item. Only portion 600B, which contains code 601, needs to be placed on a letter or package to ensure its delivery to the intended destination.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth. Therefore, many modifications may be made to adapt a particular situation or material to the teachings of the invention without departing from the essential scope and spirit of the present invention. It is intended that the invention not be limited to the particular embodiments disclosed, but that the invention will include all embodiments and equivalents falling within the scope of the claims.

What is claimed is:

1. A method for generating a digital receipt for postage using a computer system, the method comprising:

receiving an electronic request for a postage disbursement transaction comprising a payment method;

generating a digital receipt that digitally encodes data comprising a digital signature, a transaction identification code, and a transaction amount or number of units authorized;

storing additional IBIP data associated with the postage disbursement transaction in a database; and printing the digital receipt on a stamp without printing the additional IBIP data on the stamp; and providing access to the additional IBIP data in the database upon receipt of the transaction identification code to allow the stamp to be processed.

2. The method of claim 1 wherein receiving the electronic request for the transaction further comprises receiving the electronic request including the payment method and the transaction amount or the number of units as input from a user.

3. The method of claim 1 wherein the data in the digital receipt consists only of the digital signature, the transaction identification code, and the transaction amount or the number of units authorized.

4. The method of claim 1 further comprising storing the digital receipt on a computer readable medium.

5. The method of claim 1 wherein the additional IBIP data includes a date of mailing, an identification code for a stamp printing device, an identification code for software used by the stamp printing device, an ascending register, and a descending register.

6. The method of claim 1 further comprising:

transmitting an electronic authorization that comprises the transaction amount or number of units authorized and the transaction identification code.

7. The method of claim 1 wherein the digital receipt comprises a bar code.

8. The method of claim 1 wherein the digital receipt comprises a hexadecimal number.

9. The method of claim 1 wherein the digital receipt comprises a base 64 number.

10. A computer system comprising:

code for receiving an electronic request for a postage disbursement transaction;

code for generating a digital receipt that includes a digital signature, a transaction identification, and a transaction amount or number of units authorized;

code for storing additional IBIP data associated with the postage disbursement transaction in a database;

code for printing the digital receipt on a stamp without printing the additional IBIP data on the stamp;

code for providing access to the database to retrieve additional IBIP data upon receipt of the transaction identification to allow the stamp to be processed; and a computer readable medium for storing the codes.

11. The computer system of claim 10 wherein the digital receipt consists only of the digital signature, the transaction identification, and the transaction amount or number of units authorized.

12. The computer system of claim 10 wherein the additional IBIP data includes a date of mailing, an identification code for a stamp printing device, an ascending register, and a descending register.

13. The computer system of claim 10 wherein the digital receipt comprises a readable bar code.

14. The computer system of claim 10 wherein the digital receipt comprises a hexadecimal number.

15. The computer system of claim 10 wherein the digital receipt comprises a base 64 number.

16. An authentication system comprising:

a routine for providing a user with an opportunity to enter a requested postage transaction amount or number or units;

a routine for generating a digital signature;

a routine for generating a digital receipt that digitally encodes data comprising the digital signature, a transaction identification code, and the transaction amount or the number of units;

a routine for printing the digital receipt on a medium without printing the additional IBIP data on the medium; and a routine for providing access to a database to retrieve additional IBIP data upon receipt of the transaction identification code to allow the medium to be processed a computer readable medium for storing the routines.

17. The authentication system of claim 16 wherein the routine for providing the user with the opportunity to enter the requested transaction amount or number of units is performed on a client computer; and the routines for generating the digital signature and the digital receipt are performed on a server computer that is in electronic communication with the client computer.

18. The authentication system of claim 16 wherein the routine for providing the user with the opportunity to enter the requested transaction amount or number of units, and the routines for generating the digital signature and the digital receipt are performed on the same computer.

19. The authentication system of claim 16 further comprising:

a routine for storing the digital receipt on a computer readable medium.

20. The authentication system of claim 16 wherein the additional IBIP data includes a date of mailing, an identification code for a stamp printing device, an identification code for software used by the stamp printing device, an ascending register, and a descending register.

* * * * *